United States Patent [19]

Suga

[11] Patent Number: 5,407,315
[45] Date of Patent: Apr. 18, 1995

[54] CONVEYOR TRANSFER APPARATUS AND METHOD

[75] Inventor: Tadura Suga, Ibaraki, Japan

[73] Assignees: Ossid Corporation, Rocky Mount, N.C.; Ibaraki Seiki Machinery Company, Ltd., Osaka, Japan

[21] Appl. No.: 182,973

[22] Filed: Jan. 14, 1994

[51] Int. Cl.⁶ .............................................. B65G 37/00
[52] U.S. Cl. ................................ 414/564; 198/468.8; 414/627
[58] Field of Search ................................ 414/627, 564; 198/803.15, 468.8, 457, 832.1

[56] References Cited

U.S. PATENT DOCUMENTS 4,750,605  6/1988  Brems et al. ...................... 198/468.8
4,850,472  7/1989  Liebel et al. ..................... 198/468.8
5,024,575  6/1991  Anderson ............................ 414/627

FOREIGN PATENT DOCUMENTS 167110  6/1989  Japan ................................. 198/468.8

Primary Examiner—Michael S. Huppert
Assistant Examiner—Thomas J. Brahar
Attorney, Agent, or Firm—Olive & Olive

[57] ABSTRACT

An apparatus and method are disclosed directed to transferring articles from a first delivery conveyor to a second transfer and discharge conveyor located above the first delivery conveyor. The second transfer and discharge conveyor has a series of longitudinally spaced openings through which the articles are lifted from the first delivery conveyor for placement on the second transfer and discharge conveyor.

15 Claims, 3 Drawing Sheets

CONVEYOR TRANSFER APPARATUS AND METHOD

FIELD OF THE INVENTION

This invention relates broadly to an apparatus and method for transferring an article or articles from one location below a conveyor to another location on the conveyor. More specifically, the invention relates to an apparatus and method for transferring an article or articles from a first conveyor to a second conveyor.

BACKGROUND ART

A common need in industry is that of having to transfer an article from one conveyor to another conveyor. The word "article", even though used in the singular, is meant to mean an individual article, a container filled with articles, a package, a group of articles or any other item transferred from one conveyor to another conveyor. In this regard, it has been known to use a magnetic pickup device to assist in a conveyor to conveyor transfer such as shown in U.S. Pat. No. 4,597,490. It has also been known to use a vacuum cup and a vacuum chamber below a conveyor having longitudinally spaced holes to facilitate positioning of articles in a conveying operation such as shown in U.S. Pat. No. 5,167,316. Vacuum cups have also been used to assist in transferring articles as in U.S. Pat. No. 4,961,490. However, in many types of industrial environments and particularly in the space restricted environment often found in poultry packaging plants the types of known conveyor to conveyor transfer systems are not suited to the environment.

No existing conveyor to conveyor transfer apparatus so far as is known has used a first conveyor with longitudinally spaced openings of sufficient size to permit an article to be lifted from a second conveyor located below the first conveyor through an opening in the first conveyor and then deposited onto the first conveyor for subsequent discharge by the first conveyor to another downstream work station. It is recognized that by positioning the articles to be transferred directly beneath a transfer conveyor, the lifting transfer mechanism needs only to move vertically downward and upward, which saves the motion and associated time of moving sidewards and returning as in prior transfer apparatus, thus improving efficiency.

It thus becomes a principal object of the present invention to provide an improved conveyor to conveyor transfer apparatus, system and method particularly suited to conditions in the poultry packaging industry and in which at least one of the conveyors in the system permits an article to be raised through and deposited onto such conveyor. Other objects will become apparent as the description proceeds.

SUMMARY OF INVENTION

The invention in the illustrative described embodiment provides an improved conveyor to conveyor transfer apparatus and method in which articles located on a first intermittently driven delivery conveyor are sequentially delivered to a location below an opening in a second intermittently driven transfer conveyor. The articles are raised through such opening in the second conveyor and deposited back onto the second transfer conveyor at another location longitudinally spaced from the opening through which the article was raised and are then discharged to a downstream work station by subsequent movement of the second transfer conveyor.

DESCRIPTION OF THE PREFERRED EMBODIMENT

Figure 1:
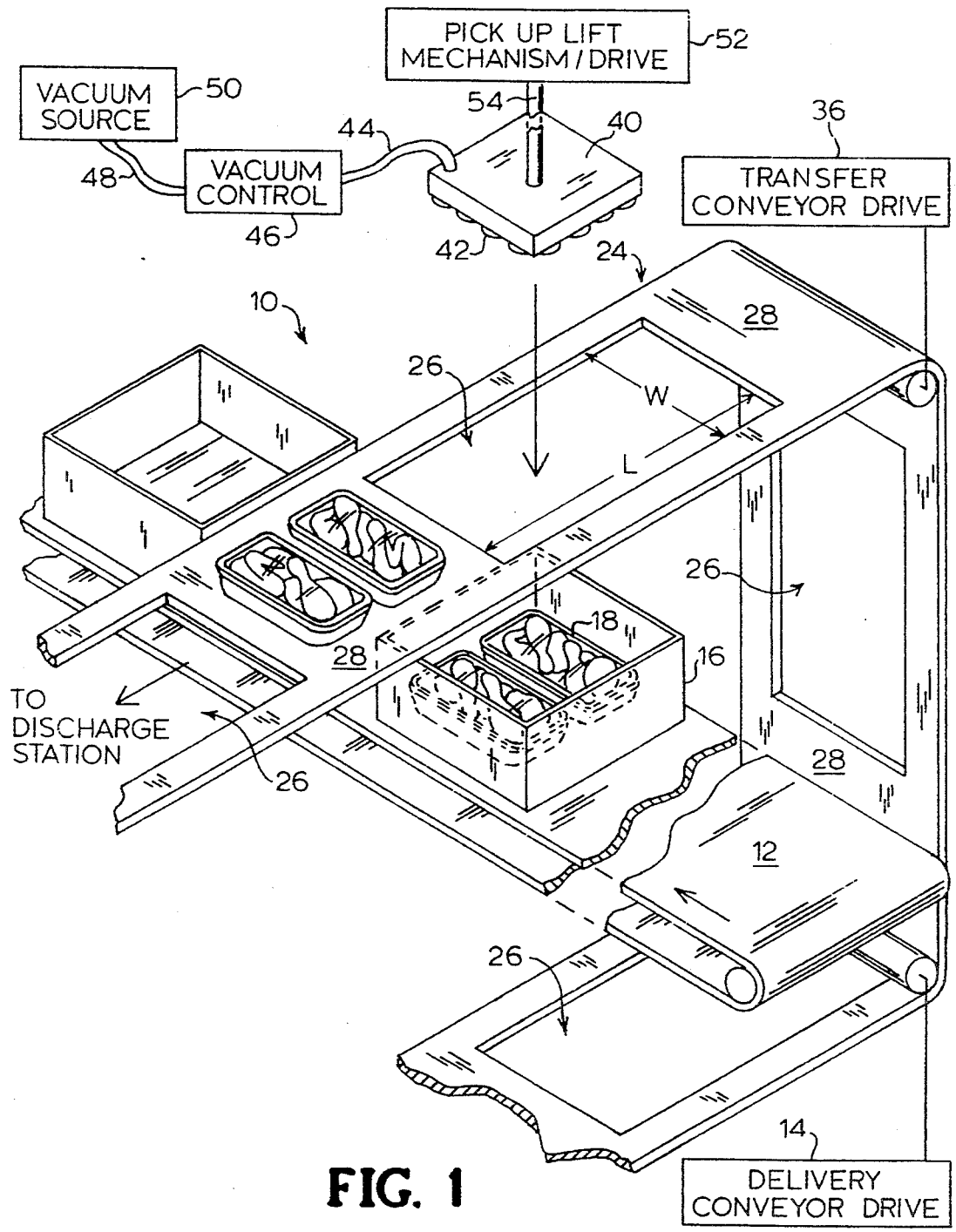
FIG. 1 is a schematic perspective drawing of a conveyor to conveyor transfer apparatus according to the invention.
Figure 2:
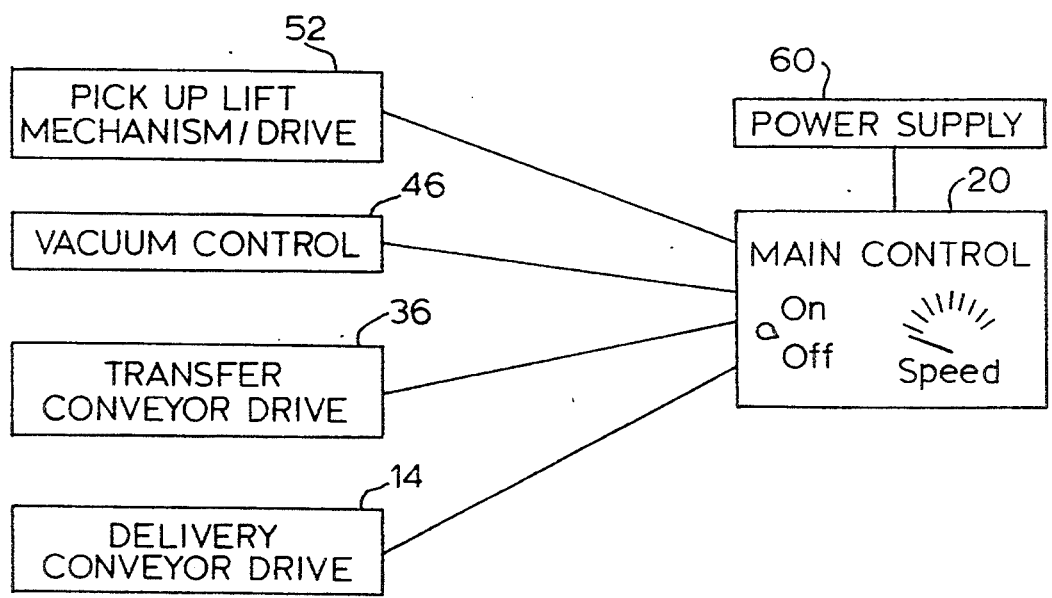
FIG. 2 is a control diagram for the apparatus of FIG. 1.

Making reference to the drawings the conveyor to conveyor transfer apparatus and method of the invention are somewhat schematically illustrated in a form particularly suited to use in the poultry packaging industry. The illustrated apparatus of the invention generally provides a means for transferring an article from one conveyor, referred to as a delivery conveyor, to another conveyor, referred to as a transfer conveyor, from which the article is discharged to some other downstream work station associated with processing of the article. More specifically the conveyor to conveyor apparatus 10 of the invention incorporates a delivery conveyor 12 having a suitable electrically operated delivery conveyor drive 14. A succession of containers 16, filled with one or more articles, such as a pair of film wrapped poultry packages 18, are manually or otherwise placed on delivery conveyor 12. An associated delivery conveyor drive 14 is intermittently energized through a main electrical control 20 (FIG. 2). Another conveyor referred to as the transfer conveyor 24 comprises a conveyor having a series of longitudinally spaced openings 26 located between other portions 28 which are capable of supporting the articles to be transferred as in FIGS. 1 and 6. Openings 26 may be of any suitable shape but are illustrated as being of rectangular form of appropriate length L and width W suited to the size article or articles being transferred. Transfer conveyor 24 may comprise, by way of example, a flat belt conveyor, a chain-slat or a chain-rod conveyor with the longitudinal spaced openings formed and located at spaced uniform intervals, such that each opening 26 appears between a pair of supportive portions 28 of the conveyor in whatever form the transfer conveyor is made. Transfer conveyor 24 is driven by an electrically operated transfer conveyor drive 36 which is intermittently energized through main control 20. Since controls and timing devices are well known in the art and any of a wide variety of such controls and timing devices are suited to the invention, no more detailed description is deemed necessary for those skilled in the art.

Lifting of articles through an opening 26 in the transfer conveyor 24 may be accomplished by any suitable vacuum, magnetic or other lifting device appropriate to the nature of the articles to be lifted. A vacuum pickup head 40 fitted with vacuum cups 42 and fed by a vacuum line 44 through a suitable valve or vacuum control 46 connected through a vacuum line 48 to a vacuum source 50 is illustrated by way of example in reference to lifting film wrapped poultry tray packages as exemplified by articles 16. Pickup head 40 is raised and lowered by a suitable electrically controlled pickup lift mechanism/drive 52 which may be any suitable air piston, hydraulic, or electrically energized mechanical driven mechanism and as will be apparent to those skilled in the art, may be electrically, pneumatically or hydraulically controlled as well known in the art. FIG. 1 thus schematically and diagrammatically represents one such electrically controlled pickup length mechanism/drive 52 having a drive rod 54 which raises and lowers the vacuum pickup head 40.

Main control 20 is connected to the respective electrically controlled pickup lift mechanism/drive 52, vacuum control 46, delivery conveyor drive 14, transfer conveyor drive 36 and power supply 60. It will be understood that main control 20 incorporates suitable timing mechanisms to insure the coordinated and synchronized operation of delivery conveyor 12, transfer conveyor 24 and pickup head 40.

Figure 3:
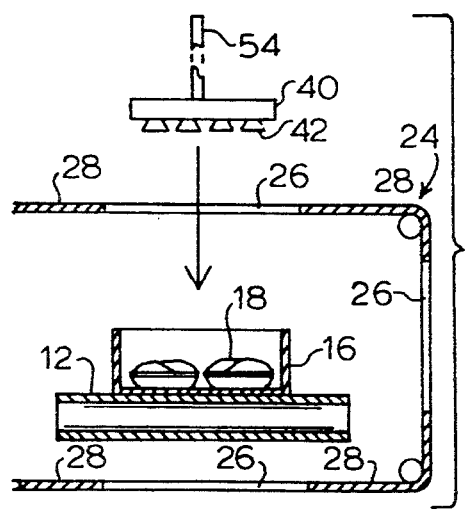
FIG. 3 is a schematic illustration showing the vacuum pickup head above an opening in the transfer conveyor and with a container having film wrapped trays of poultry packages positioned on the delivery conveyor below the opening with the packages ready to be picked up from the container on the delivery conveyor and transferred to the transfer conveyor.
Figure 4:
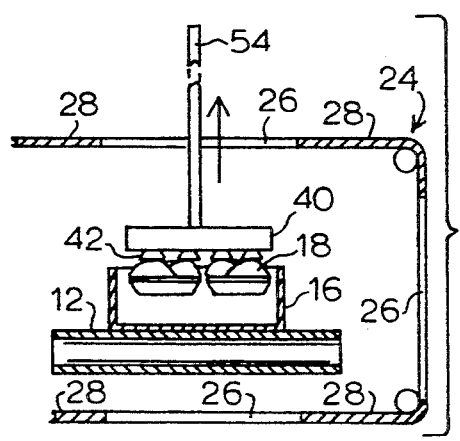
FIG. 4 is a schematic illustration like FIG. 3, with the vacuum pickup head lowered and attached through suction to the poultry packages and shown slightly raised above the container on the delivery conveyor enroute to being raised through the opening in the transfer conveyor.
Figure 5:
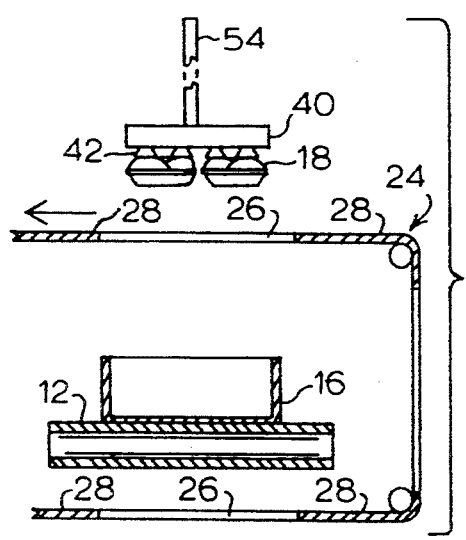
FIG. 5 is a schematic illustration like FIG. 3 with the vacuum pickup head attached to the poultry packages with the packages raised to a position immediately above the opening in the transfer conveyor.
Figure 6:
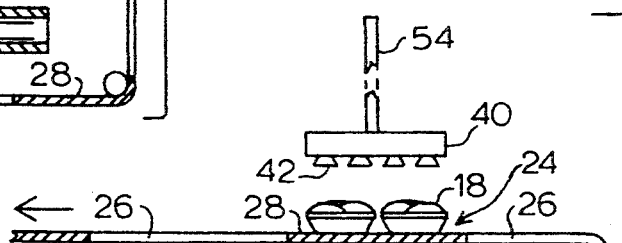
FIG. 6 is a schematic illustration like FIG. 3 showing the poultry packages after the transfer conveyor has been moved, the poultry packages positioned on a supportive portion of the transfer conveyor and the vacuum pickup head released from the packages and raised to the position of FIG. 3 ready to repeat the cycle.
Figure 6:
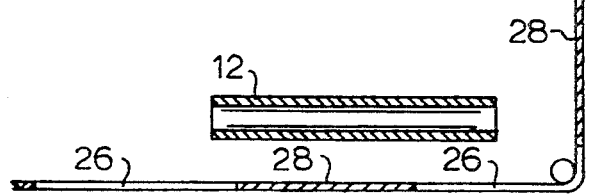
Figure 1:
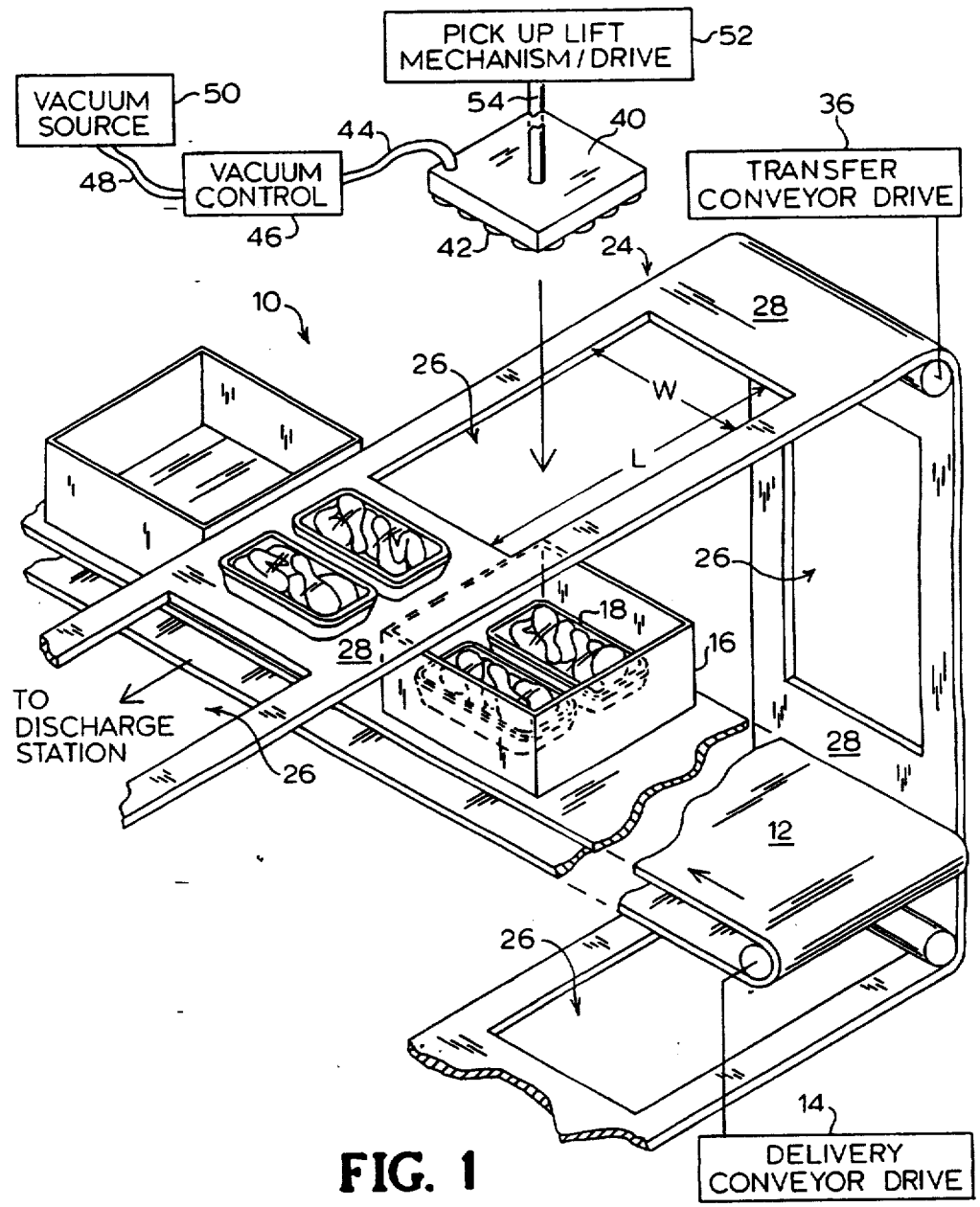

A typical sequence of operations is schematically illustrated in FIGS. 3–6. As previously referred to in the figure descriptions, FIG. 3 illustrates the transfer conveyor 24 in a stopped position with pickup head 40 positioned above an opening 26 and over articles 18 in container 16 residing on delivery conveyor 12. Articles 18 are thus positioned ready to be transferred to transfer conveyor 24. In the next sequence of operation, FIG. 4 illustrates pickup head 40 lowered and attached to articles 18 and the articles slightly raised above the bottom of container 16 enroute to being lifted through an opening 26 in transfer conveyor 24. In FIG. 5, the articles 16 are shown positioned above transfer conveyor 24 ready for transfer conveyor 24 to be moved to the position shown in FIG. 6. In FIG. 6, articles 18 are shown deposited on a supportive portion 28 of transfer conveyor 24 ready for transfer conveyor 24 to be moved in the article discharge direction, indicated by an arrow in FIG. 6, and delivery conveyor 12 to be advanced in the article delivery direction, indicated by an arrow in FIG. 1 on delivery conveyor 12, such that a successive transfer conveyor opening 26 and successive container 16 with successive articles 18 assume the respective positions shown in FIG. 1 ready for the described cycle to be repeated.

It will be understood that as transfer conveyor 24 is successively advanced in the discharge direction, those articles 18 successively placed on transfer conveyor 24 will be discharged from transfer conveyor 24 to the next downstream work station appropriate to the nature of the articles being processed.

While intermittently and coordinated operation of delivery conveyor 12, conveyor 24 and pickup head 40 has been described and is presently recognized as being the preferred form of operation, it is also recognized that by making the dimension length L of each opening 26 sufficiently long and operating pickup head relatively rapidly, it becomes possible to operate transfer conveyor 24 continuously at one appropriate speed rather than intermittently in coordination with operating delivery conveyor 12 intermittently. In all such examples of the invention the advantages derived by lifting the article or articles to be transferred from a location below the transfer conveyor through an opening in the transfer conveyor are retained.

Although the invention has been described with a certain degree of particularity, it is thus to be understood that the present disclosure of the preferred form of the invention has been made only by way of example and that changes in the detail of construction and combination and arrangement of improvements of the invention may be resorted to without departing from the spirit and scope of the invention.

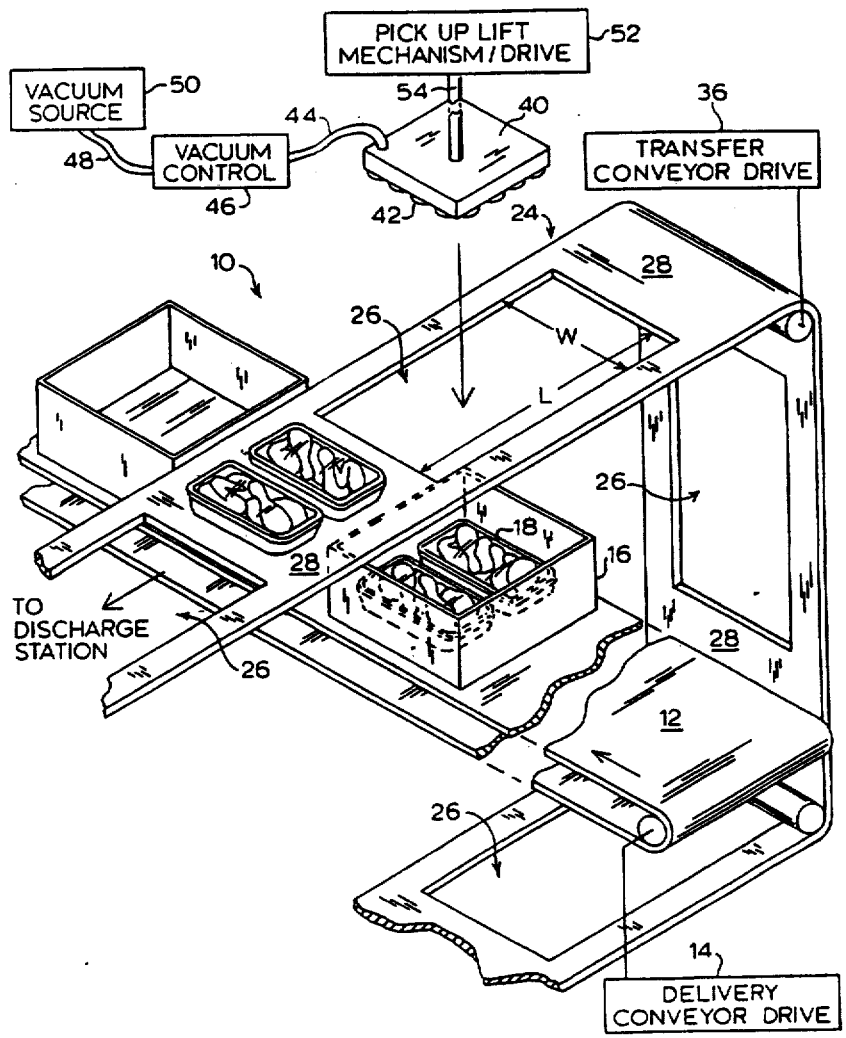

What is claimed is:

1. An apparatus for transferring an article from a first location below a conveyor to a second location on the conveyor from which second location the articles can be conveyed by the conveyor, comprising:
   (a) a first endless conveyor having a series of longitudinally spaced openings;
   (b) first drive means for driving said first endless conveyor at predetermined times in a first given direction such that a selected opening in the said first endless conveyor can be positioned immediately above a first location at which is located an article to be conveyed by the said first endless conveyor; and
   (c) lifting means located above said first endless conveyor and including means adapted for being lowered to and lifting an article from said first location through a said selected opening and thereafter depositing such article on a portion of said first endless conveyor longitudinally spaced from said selected opening in coordination with operation of said first: drive means.

2. An apparatus as claimed in claim 1 wherein said article comprises a film wrapped package and said lifting means is of a vacuum suction type.

3. An apparatus as claimed in claim 1 including:
   (a) a second endless conveyor having an article delivery portion thereof positionable below said selected opening; and
   (b) second drive means for driving the said second endless conveyor at predetermined times in a second given direction in coordination with operation of said first drive means and said lifting means whereby each said article in a succession of articles is delivered to said first location.

4. An apparatus as claimed in claim 3 wherein said succession of articles comprise film wrapped packages and said lifting means is of a vacuum suction type.

5. An apparatus as claimed in claim 3 and wherein said second drive means drives said second endless conveyor intermittently in said second given direction in coordination both with intermittent operation of said first endless conveyor and said lifting means.

6. An apparatus as claimed in claim 1 wherein each said opening is of uniform rectangular shape and said openings are uniformly spaced along said first conveyor.

7. An apparatus as claimed in claim 1 wherein said first drive means drives said first endless conveyor intermittently in said first given direction in coordination with intermittent operation of said lifting means.

8. A method for transferring an article from a first location below a conveyor to a second location on the conveyor from which second location the article can be conveyed by the conveyor; comprising:
   (a) locating a first endless conveyor with longitudinally spaced openings such that a portion thereof always resides and travels above a first location;
   (b) delivering articles to be transferred in sequence to said first location;
   (c) positioning a selected opening in said first endless conveyor above said first location by driving said first endless conveyor in a first given direction in coordination with sequentially delivering articles to said first location; and
   (d) lifting the articles as delivered in sequence from said first location through a said selected opening and depositing such lifted articles sequentially on a portion of said first endless conveyor longitudinally spaced from said selected opening.

9. A method as claimed in claim 8 including the steps:
   (a) utilizing a second endless conveyor having a portion which always travels and is located below a portion of said first endless conveyor to deliver said articles to said first location; and
   (b) driving said second endless conveyor in a second given direction in coordination with positioning of said selected opening in said first endless conveyor and said lifting.

10. A method as claimed in claim 9 including the step of operating said first endless conveyor and said second endless conveyor and conducting said lifting intermittently and in coordination.

11. A conveyor apparatus which enables a series of articles conveyed sequentially to a first location at one level to be sequentially transferred to and conveyed away from a second location at a higher level, comprising:
   (a) a first endless conveyor adapted to be driven in a first given direction and arranged such that each article in a series of articles placed on said first conveyor can be conveyed in sequence in said first given direction to a first location;
   (b) first drive means for driving said first endless conveyor at predetermined times in said first given direction such that each said article is conveyed to said first location in sequence;
   (c) a second endless conveyor adapted to be driven in a second given direction and having a series of longitudinally spaced openings, said second endless conveyor being located such that a portion thereof always resides and travels above said first location;
   (d) second drive means for driving said second endless conveyor at predetermined times in said second given direction in a manner wherein each said opening in said second endless conveyor is moved in the said second given direction in sequence to a position located above a said article at said first location; and
   (e) lifting means located above said second endless conveyor and including means adapted for lifting an article moved to said first location through a selected said opening positioned above said first location and after said selected opening has been moved in said first given direction depositing the said article on an article support portion of said second conveyor longitudinally spaced from said selected opening and being operative in coordination with said first and second drive means.

12. A conveyor apparatus as claimed in claim 11 wherein each said article comprises a film wrapped package and said lifting means is of a vacuum suction type.

13. A conveyor apparatus as claimed in claim 11 wherein each said opening is of uniform rectangular shape and said openings are uniformly spaced along said first endless conveyor.

14. A conveyor apparatus as claimed in claim 11 wherein said second drive means drives said second endless conveyor intermittently in coordination both with intermittent operation of said first endless conveyor and said lifting means.

15. A conveyor apparatus which enables a series of articles conveyed sequentially to a first location at one level to be sequentially transferred to and conveyed away from a second location at a higher level, comprising:
   (a) a first endless conveyor adapted to be intermittently driven in a first given direction and positioned such that each article in a series of articles placed on the said first conveyor can be conveyed in sequence in said first given direction to a first location and there held until lifted from said first conveyor to a second location above said first location, said first conveyor being further adapted after each such said article has been lifted to advance in the same said direction until the next successive said article has been conveyed to said first location;
   (b) a second endless conveyor adapted to be intermittently driven in a second given direction and having a series of longitudinally spaced openings and supportive portions bounding said openings, said second endless conveyor being positioned such that a portion thereof always resides and travels above said first location and being adapted to permit each article arriving at said first location to be lifted through a selected said opening stationed over said first location and after being lifted through such selected said opening to be lowered back onto a supportive portion of said second conveyor offset lengthwise of the said second conveyor from the said selected opening through which the article was lifted;
   (c) drive means for driving said first and second endless conveyors at predetermined times in said respective first and second given directions in a coordinated sequence such that each said opening in said second endless conveyor is moved in turn in the said second given direction to a stationary position located above a said article stationed on said first endless conveyor at said first location and remains in such stationary position at least for the time required to lift the article stationed at said first location through said opening and thereafter to drive said first endless conveyor until the next successive said article is brought to said first location and to drive said second endless conveyor intermittently in said second direction in a manner enabling the said lifted article to be placed onto a supportive portion of said second conveyor offset lengthwise of the second said conveyor from the said selected conveyor through which the article was lifted and another said opening positioned above said first location; and (d) lifting means located above said second endless conveyor and including means adapted for lifting an article moved to said first location through a selected said opening positioned above said first location and after said selected opening has been moved in said first given direction depositing the said article on an article support portion of said second conveyor longitudinally spaced from said selected opening and being operative in coordination with said drive means.

* * * * *

UNITED STATES PATENT AND TRADEMARK OFFICE
CERTIFICATE OF CORRECTION

PATENT NO. : 5,407,315
DATED     : April 18, 1995
INVENTOR(S) : Tadura Suga

It is certified that error appears in the above-indentified patent and that said Letters Patent is hereby corrected as shown below:

In the drawing:
Column 4, line 45, delete ":".

In Figure 1, the line leading from the box labelled "Delivery Conveyor Drive" 14 is shown connected to a roller associated with transfer conveyor 24. It should have been shown connected to a roller associated with delivery conveyor 12, and has been corrected in the drawing enclosed. For convenience, a copy of the original drawing with the corrections marked in red ink is also enclosed.

The title page, should be deleted to be replaced with the attached title page. The drawing sheet, consisting of Fig. 1, should be deleted to be replaced with the drawing sheet, consisting of Fig. 1, as shown on the attaced page.

Signed and Sealed this

Eighteenth Day of July, 1995

Attest:

BRUCE LEHMAN

Attesting Officer

Commissioner of Patents and Trademarks

United States Patent [19]

Suga

[11] Patent Number: 5,407,315
[45] Date of Patent: Apr. 18, 1995

[54] CONVEYOR TRANSFER APPARATUS AND METHOD

[75] Inventor: Tadura Suga, Ibaraki, Japan

[73] Assignees: Ossid Corporation, Rocky Mount, N.C.; Ibaraki Seiki Machinery Company, Ltd., Osaka, Japan

[21] Appl. No.: 182,973

[22] Filed: Jan. 14, 1994

[51] Int. Cl.⁶ .............................................. B65G 37/00
[52] U.S. Cl. ................................ 414/564; 198/468.8; 414/627
[58] Field of Search ........................... 414/627, 564; 198/803.15, 468.8, 457, 832.1

[56] References Cited

U.S. PATENT DOCUMENTS 4,750,605 6/1988 Brems et al. ................ 198/468.8
4,850,472 7/1989 Liebel et al. ................ 198/468.8
5,024,575 6/1991 Anderson ..................... 414/627

FOREIGN PATENT DOCUMENTS 167110 6/1989 Japan ........................... 198/468.8

Primary Examiner—Michael S. Huppert
Assistant Examiner—Thomas J. Brahar
Attorney, Agent, or Firm—Olive & Olive

[57] ABSTRACT

An apparatus and method are disclosed directed to transferring articles from a first delivery conveyor to a second transfer and discharge conveyor located above the first delivery conveyor. The second transfer and discharge conveyor has a series of longitudinally spaced openings through which the articles are lifted from the first delivery conveyor for placement on the second transfer and discharge conveyor.

15 Claims, 3 Drawing Sheets